US012609853B2

(12) United States Patent
Tervo et al.

(10) Patent No.: US 12,609,853 B2
(45) Date of Patent: Apr. 21, 2026

(54) AGGREGATED PHASE TRACKING REFERENCE SIGNAL PATTERN

(71) Applicant: Nokia Technologies Oy, Espoo (FI)

(72) Inventors: Oskari Tervo, Oulu (FI); Esa Tapani Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/547,023

(22) PCT Filed: Jan. 24, 2022

(86) PCT No.: PCT/FI2022/050041
§ 371 (c)(1),
(2) Date: Aug. 18, 2023

(87) PCT Pub. No.: WO2022/207960
PCT Pub. Date: Oct. 6, 2022

(65) Prior Publication Data
US 2024/0314012 A1 Sep. 19, 2024

(30) Foreign Application Priority Data

Apr. 1, 2021 (FI) ..................................... 20215403

(51) Int. Cl.
*H04L 27/26* (2006.01)
*H04L 5/00* (2006.01)
(52) U.S. Cl.
CPC ........ *H04L 27/2613* (2013.01); *H04L 5/0094* (2013.01); *H04L 27/2636* (2013.01); *H04L 5/0048* (2013.01)

(58) Field of Classification Search
CPC ............. H04L 27/2613; H04L 27/2636; H04L 5/0094; H04L 5/0048; H04B 7/1851
See application file for complete search history.

(56) References Cited

U.S. PATENT DOCUMENTS

| | | |
|---|---|---|
| 2019/0158171 A1 | 5/2019 | Ren et al. |
| 2020/0007369 A1 | 1/2020 | Ciochina-Duchesne et al. |
| 2020/0137745 A1* | 4/2020 | Bachu ................... H04L 69/321 |

(Continued)

FOREIGN PATENT DOCUMENTS

| | | |
|---|---|---|
| CN | 112564878 A | 3/2021 |
| EP | 3611862 A1 | 2/2020 |

(Continued)

OTHER PUBLICATIONS

"3rd Generation Partnership Project; Technical Specification Group Radio Access Network; NR; Physical channels and modulation (Release 16)", 3GPP TS 38.211, V16.4.0, Dec. 2020, pp. 1-133.

(Continued)

*Primary Examiner* — Mounir Moutaouakil
(74) *Attorney, Agent, or Firm* — Lippes Mathias LLP

(57) ABSTRACT

Disclosed is a method comprising selecting an aggregated phase tracking reference signal pattern (401) comprising a combination of two or more phase tracking reference signal patterns, receiving an uplink grant from a base station (402), and transmitting, to the base station, an uplink transmission (403) based at least partly on the uplink grant and the aggregated phase tracking reference signal pattern by using discrete Fourier transform spread orthogonal frequency division multiplexing.

13 Claims, 6 Drawing Sheets

(56) References Cited

U.S. PATENT DOCUMENTS

| | | | | |
|---|---|---|---|---|
| 2020/0280473 | A1* | 9/2020 | Levinbook | H04L 27/2636 |
| 2020/0304259 | A1 | 9/2020 | Ihalainen et al. | |
| 2020/0366436 | A1 | 11/2020 | Cases et al. | |
| 2020/0412592 | A1 | 12/2020 | Akkarakaran et al. | |
| 2021/0044402 | A1* | 2/2021 | Gao | H04L 5/0048 |
| 2022/0210765 | A1* | 6/2022 | Cao | H04L 5/0092 |
| 2022/0311571 | A1* | 9/2022 | Cheng | H04L 5/005 |
| 2022/0312334 | A1* | 9/2022 | Gao | H04L 1/0003 |
| 2023/0006794 | A1* | 1/2023 | Tervo | H04L 5/0051 |
| 2023/0076789 | A1* | 3/2023 | Oteri | H04W 52/325 |
| 2024/0014967 | A1* | 1/2024 | Hua | H04L 5/0048 |
| 2024/0056960 | A1* | 2/2024 | Axmon | H04W 48/20 |

FOREIGN PATENT DOCUMENTS

| | | |
|---|---|---|
| EP | 3621235 A1 | 3/2020 |
| GB | 2568943 A | 6/2019 |
| WO | 2018/141282 A1 | 8/2018 |
| WO | 2018/173417 A1 | 9/2018 |
| WO | 2020/033198 A1 | 2/2020 |
| WO | 2020/146275 A1 | 7/2020 |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"3rd Generation Partnership Project; Technical Specification Group Radio Access Network; Study on supporting NR from 52.6 GHz to 71 GHz (Release 17)", 3GPP TR 38.808, V0.2.0, Nov. 2020, pp. 1-159.

"Revised WID: Extending current NR operation to 71 GHz", 3GPP TSG RAN Meeting #90-e, RP-202925, Agenda: 9.8.2, CMCC, Dec. 7-11, 2020, 6 pages.

"RAN1 Chairman's Notes", 3GPP TSG RAN WG1 Meeting #104-e, Jan. 25-Feb. 5, 2021, 148 pages.

Berardinelli, "Generalized DFT-s-OFDM Waveforms Without Cyclic Prefix", IEEE Access, vol. 6, Dec. 7, 2017, pp. 4677-4689.

"3rd Generation Partnership Project; Technical Specification Group Radio Access Network; NR; Radio Resource Control (RRC) protocol specification (Release 15)", 3GPP TS 38.331, V15.11.0, Sep. 2020, pp. 1-541.

"PDSCH/PUSCH enhancements for 52-71GHz band", 3GPP TSG RAN WG1 Meeting #104-e, R1-2100201, Agenda: 8.2.5, Huawei, Jan. 25-Feb. 5, 2021, 16 pages.

Zheng et al., "Phase Noise Compensation for DFT-s-OFDM Waveforms in MIMO System", IEEE 4th International Conference on Computer and Communications (ICCC), Dec. 7-10, 2018, pp. 430-434.

Chandrashekhar et al., "Multiplexing Reference Signals and Data in a DFT-s-OFDM Symbol", International Conference on Signal Processing and Communications (SPCOM), Jul. 16-19, 2018, pp. 277-281.

Office action received for corresponding Finnish Patent Application No. 20215403, dated Sep. 30, 2021, 7 pages.

"PDSCH/PUSCH enhancements", 3GPP TSG RAN WG1 #104-e, R1-2100261, Agenda: 8.2.5, Nokia, Jan. 25-Feb. 5, 2021, 24 pages.

"PDSCH/PUSCH enhancements", 3GPP TSG RAN WG1 #106, R1-2107108, Agenda: 8.2.5, Nokia, Aug. 16-27, 2021, 32 pages.

International Search Report and Written Opinion received for corresponding Patent Cooperation Treaty Application No. PCT/FI2022/050041, dated Apr. 6, 2022, 15 pages.

Extended European Search Report received for corresponding European Patent Application No. 22779205.8, dated Jan. 29, 2025, 9 pages.

"Summary of PDSCH/PUSCH enhancements (Bandwidth/Timeline/Reference signals)", 3GPP TSG RAN WG1 Meeting #104-e, R1-2101776, Agenda: 8.2.5, vivo, Jan. 25-Feb. 5, 2021, pp. 1-29.

"PDSCH/PUSCH enhancements", 3GPP TSG RAN WG1 #104bis-e, R1-2102562, Agenda: 8.2.5, Nokia, Apr. 12-20, 2021, 29 pages.

* cited by examiner

| 401 | Select PTRS pattern |
| 402 | Receive uplink grant |
| 403 | Transmit uplink transmission |

| 501 | Determine at least one aggregated PTRS pattern |
| 502 | Transmit configuration |
| 503 | Transmit uplink grant |
| 504 | Receive uplink transmission |

700

800

AGGREGATED PHASE TRACKING REFERENCE SIGNAL PATTERN

RELATED APPLICATION

This application was originally filed as PCT Application No. PCT/FI2022/050041, filed on Jan. 24, 2022, which claims priority from FI application No. 20215403, filed on Apr. 1, 2021, each of which is incorporated herein by reference in its entirety.

FIELD

The following exemplary embodiments relate to wireless communication.

BACKGROUND

In wireless communication, phase noise from transmitter and/or receiver local oscillators may degrade a wireless signal. It is desirable to mitigate the impact of phase noise.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: select an aggregated phase tracking reference signal pattern comprising a combination of two or more phase tracking reference signal patterns; receive an uplink grant from a base station; and transmit, to the base station, an uplink transmission based at least partly on the uplink grant and the aggregated phase tracking reference signal pattern by using discrete Fourier transform spread orthogonal frequency division multiplexing.

According to another aspect, there is provided an apparatus comprising means for: selecting an aggregated phase tracking reference signal pattern comprising a combination of two or more phase tracking reference signal patterns; receiving an uplink grant from a base station; and transmitting, to the base station, an uplink transmission based at least partly on the uplink grant and the aggregated phase tracking reference signal pattern by using discrete Fourier transform spread orthogonal frequency division multiplexing.

According to another aspect, there is provided a method comprising: selecting an aggregated phase tracking reference signal pattern comprising a combination of two or more phase tracking reference signal patterns; receiving an uplink grant from a base station; and transmitting, to the base station, an uplink transmission based at least partly on the uplink grant and the aggregated phase tracking reference signal pattern by using discrete Fourier transform spread orthogonal frequency division multiplexing.

According to another aspect, there is provided a computer program comprising instructions for causing an apparatus to perform at least the following: select an aggregated phase tracking reference signal pattern comprising a combination of two or more phase tracking reference signal patterns; receive an uplink grant from a base station; and transmit, to the base station, an uplink transmission based at least partly on the uplink grant and the aggregated phase tracking reference signal pattern by using discrete Fourier transform spread orthogonal frequency division multiplexing.

According to another aspect, there is provided a computer readable medium comprising program instructions for causing an apparatus to perform at least the following: select an aggregated phase tracking reference signal pattern comprising a combination of two or more phase tracking reference signal patterns; receive an uplink grant from a base station; and transmit, to the base station, an uplink transmission based at least partly on the uplink grant and the aggregated phase tracking reference signal pattern by using discrete Fourier transform spread orthogonal frequency division multiplexing.

According to another aspect, there is provided a non-transitory computer readable medium comprising program instructions for causing an apparatus to perform at least the following: select an aggregated phase tracking reference signal pattern comprising a combination of two or more phase tracking reference signal patterns; receive an uplink grant from a base station; and transmit, to the base station, an uplink transmission based at least partly on the uplink grant and the aggregated phase tracking reference signal pattern by using discrete Fourier transform spread orthogonal frequency division multiplexing.

According to an aspect, there is provided an apparatus comprising at least one processor, and at least one memory including computer program code, wherein the at least one memory and the computer program code are configured, with the at least one processor, to cause the apparatus to: determine at least one aggregated phase tracking reference signal pattern comprising a combination of two or more phase tracking reference signal pattern; transmit, to a terminal device, a configuration indicating the at least one aggregated phase tracking reference signal pattern; transmit, to the terminal device, an uplink grant indicating the terminal device to transmit an uplink transmission based at least partly on the at least one aggregated phase tracking reference signal pattern by using discrete Fourier transform spread orthogonal frequency division multiplexing; and receive the uplink transmission from the terminal device.

According to another aspect, there is provided an apparatus comprising means for: determining at least one aggregated phase tracking reference signal pattern comprising a combination of two or more phase tracking reference signal patterns; and transmitting, to a terminal device, a configuration indicating the at least one aggregated phase tracking reference signal pattern; transmitting, to the terminal device, an uplink grant indicating the terminal device to transmit an uplink transmission based at least partly on the at least one aggregated phase tracking reference signal pattern by using discrete Fourier transform spread orthogonal frequency division multiplexing; and receiving the uplink transmission from the terminal device.

According to another aspect, there is provided a method comprising: determining at least one aggregated phase tracking reference signal pattern comprising a combination of two or more phase tracking reference signal patterns; transmitting, to a terminal device, a configuration indicating the at least one aggregated phase tracking reference signal pattern; transmitting, to the terminal device, an uplink grant indicating the terminal device to transmit an uplink transmission based at least partly on the at least one aggregated phase tracking reference signal pattern by using discrete Fourier transform spread orthogonal frequency division multiplexing; and receiving the uplink transmission from the terminal device.

According to another aspect, there is provided a computer program comprising instructions for causing an apparatus to perform at least the following: determine at least one aggregated phase tracking reference signal pattern comprising a combination of two or more phase tracking reference signal patterns; transmit, to a terminal device, a configuration indicating the at least one aggregated phase tracking reference signal pattern; transmit, to the terminal device, an uplink grant indicating the terminal device to transmit an uplink transmission based at least partly on the at least one aggregated phase tracking reference signal pattern by using discrete Fourier transform spread orthogonal frequency division multiplexing; and receive the uplink transmission from the terminal device.

According to another aspect, there is provided a computer readable medium comprising program instructions for causing an apparatus to perform at least the following: determine at least one aggregated phase tracking reference signal pattern comprising a combination of two or more phase tracking reference signal patterns; transmit, to a terminal device, a configuration indicating the at least one aggregated phase tracking reference signal pattern; transmit, to the terminal device, an uplink grant indicating the terminal device to transmit an uplink transmission based at least partly on the at least one aggregated phase tracking reference signal pattern by using discrete Fourier transform spread orthogonal frequency division multiplexing; and receive the uplink transmission from the terminal device.

According to another aspect, there is provided a non-transitory computer readable medium comprising program instructions for causing an apparatus to perform at least the following: determine at least one aggregated phase tracking reference signal pattern comprising a combination of two or more phase tracking reference signal patterns; transmit, to a terminal device, a configuration indicating the at least one aggregated phase tracking reference signal pattern; transmit, to the terminal device, an uplink grant indicating the terminal device to transmit an uplink transmission based at least partly on the at least one aggregated phase tracking reference signal pattern by using discrete Fourier transform spread orthogonal frequency division multiplexing; and receive the uplink transmission from the terminal device.

According to another aspect, there is provided a system comprising at least a terminal device and a base station. The terminal device is configured to: select an aggregated phase tracking reference signal pattern comprising a combination of two or more phase tracking reference signal patterns; receive an uplink grant from the base station; and transmit, to the base station, an uplink transmission based at least partly on the uplink grant and the aggregated phase tracking reference signal pattern by using discrete Fourier transform spread orthogonal frequency division multiplexing. The base station is configured to: transmit the uplink grant to the terminal device; and receive the uplink transmission from the terminal device.

According to another aspect, there is provided a system comprising at least a terminal device and a base station. The terminal device comprises means for: selecting an aggregated phase tracking reference signal pattern comprising a combination of two or more phase tracking reference signal patterns; receiving an uplink grant from the base station; and transmitting, to the base station, an uplink transmission based at least partly on the uplink grant and the aggregated phase tracking reference signal pattern by using discrete Fourier transform spread orthogonal frequency division multiplexing. The base station comprises means for: transmitting the uplink grant to the terminal device; and receiving the uplink transmission from the terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
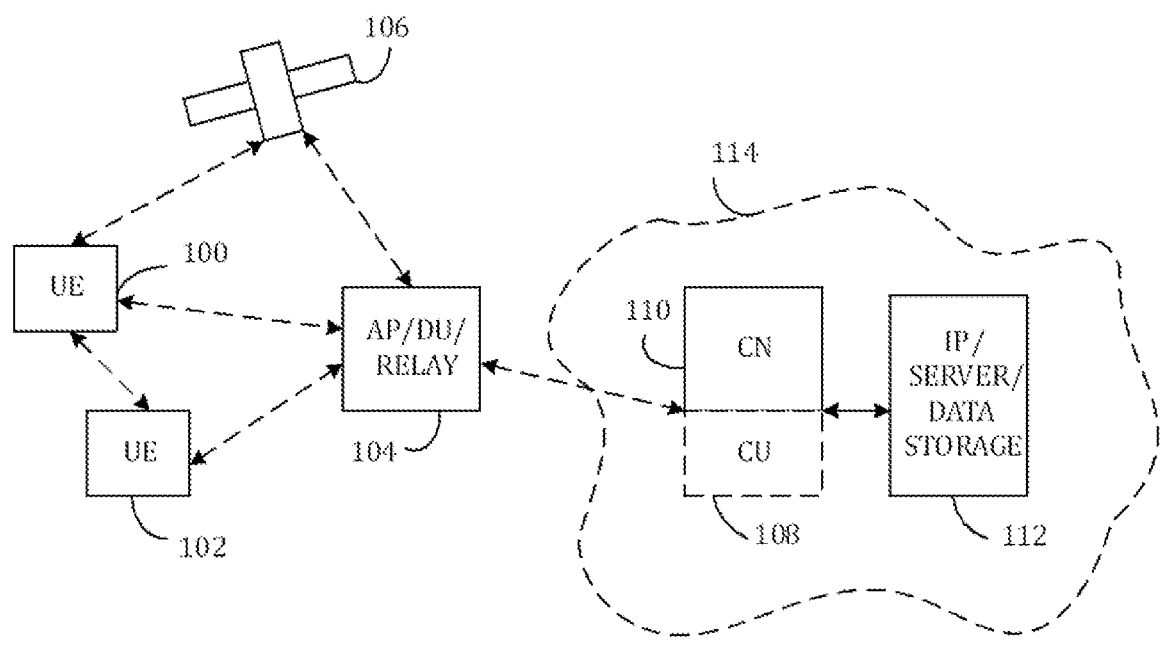
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, a.k.a. parent node) and a DU (distributed unit) part, which takes care of the access link(s), i.e. child link(s) between the IAB node and UE(s) and/or between IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

Terahertz (THz) or sub-THz frequencies may also be used for example in 6G (sixth generation) wireless communication systems or in 5G NR evolution.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. The NR self-backhauling solution may also be built on top of split architecture. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

In wireless communications, the phase noise from the transmitter and/or receiver radio frequency (RF) local oscillator (LO) may degrade the signal quality. Phase noise may increase by approximately 6 dB as the carrier frequency doubles. Therefore, phase noise may be more pronounced, for example, in the frequency range between 52.6 and 71 GHz when compared to lower frequency bands. Similarly, phase noise may be even more pronounced in frequencies above 71 GHz. This may limit the use of high order modulations, and therefore decrease the spectrum efficiency of the system.

Higher sub-carrier spacing (SCS) may be used to reduce the phase noise effect. However, increasing the SCS may impact the system, since the bandwidth and symbol rate are increased. Therefore, faster processing may be needed. In addition, the time duration of the cyclic prefix (CP)

decreases when the SCS is larger, and the CP overhead is maintained. The reduced CP may lead to radio link performance degradation due to inter-symbol interference induced by the frequency selective channel. With shorter symbol durations, the scheduling periods may become too short and control channel coverage may be degraded. In addition, reduced CP length may cause issues with beam switching, as the switch time may become longer than the CP duration. Apart from this, also higher power spectral densities (PSD) for transmitted signals with an equal number of sub-carriers $$M_{sc}^{PUSCH}$$

denotes the scheduled bandwidth for uplink transmission, expressed as a number of subcarriers. This may be counted as the number of physical resource blocks (# of PRBs) multiplied by the number of subcarriers/PRB (=12).

TABLE 1

| Number of PTRS groups | Number of samples per PTRS group | Index m of PTRS samples in OFDM symbol l prior to transform precoding |
|---|---|---|
| 2 | 2 | $s\lfloor M_{sc}^{PUSCH}/4\rfloor + k - 1$ where $s = 1, 3$ and $k = 0, 1$ |
| 2 | 4 | $sM_{sc}^{PUSCH} + k$ where $\begin{cases} s = 0 & \text{and } k = 0, 1, 2, 3 \\ s = 1 & \text{and } k = -4, -3, -2, -1 \end{cases}$ |
| 4 | 2 | $s\lfloor M_{sc}^{PUSCH}/8\rfloor + k - 1$ where $s = 1, 3, 5, 7$ and $k = 0, 1$ |
| 4 | 4 | $sM_{sc}^{PUSCH}/4 + n + k$ where $\begin{cases} s = 0 & \text{and } k = 0, 1, 2, 3 & n = 0 \\ s = 1, 2 & \text{and } k = -2, -1, 0, 1 & n = \lfloor M_{sc}^{PUSCH}/8\rfloor \\ s = 4 & \text{and } k = -4, -3, -2, -1 & n = 0 \end{cases}$ |
| 8 | 4 | $\lfloor sM_{sc}^{PUSCH}/8\rfloor + n + k$ where $\begin{cases} s = 0 & \text{and } k = 0, 1, 2, 3 & n = 0 \\ s = 1, 2, 3, 4, 5, 6 & \text{and } k = -2, -1, 0, 1 & n = \lfloor M_{sc}^{PUSCH}/16\rfloor \\ s = 8 & \text{and } k = -4, -3, -2, -1 & n = 0 \end{cases}$ | are provided with smaller SCS, and the sampling rate is smaller, thus reducing the power consumption.

With discrete Fourier transform spread orthogonal frequency division multiplexing (DFT-s-OFDM), which may also be referred to as single carrier frequency division multiple access (SC-FDMA), a time-domain phase tracking reference signal (PTRS) may be utilized to track the phase noise over time within the DFT-s-OFDM symbol and correct the received samples. In other words, a DFT-s-OFDM symbol may comprise one or more pilot sub-symbols (i.e. PTRS symbols) and one or more data sub-symbols. Herein sub-symbols refer to the group of modulation symbols that are part of an DFT-s-OFDM symbol. Pilot sub-symbols may be used for estimating phase noise and for other channel estimation purposes. Pilot sub-symbols comprise known data, i.e. known modulation symbols, which may be used to detect changes, such as phase noise, in the channel. The pilot sub-symbols are known at the receiver, and thus the receiver may compare the pilot sub-symbols comprised in a received signal against the known original pilot sub-symbols.

Currently, there may be five PTRS patterns available with different numbers of PTRS blocks per DFT-s-OFDM symbol (2, 4 or 8) and samples per PTRS block (2 or 4). A PTRS pattern may also be referred to as a PTRS group pattern or a PTRS symbol mapping. These five legacy PTRS patterns are depicted in Table 1 below, which defines PTRS allocations for DFT-s-OFDM in uplink. The PTRSs are inserted in the time-domain before the discrete Fourier transform (DFT) in the transmitter, and a PTRS pattern is selected from these five patterns according to the scheduled bandwidth (number of scheduled subcarriers). This type of multiplexing ensures that PTRS does not increase the peak-to-average ratio of the transmitted signal. In Table 1, PTRS configuration for DFT-s-OFDM may be performed by using two configuration parameters called sampleDensity and timeDensityTransformPrecoding. The parameter sampleDensity defines the sample density of PTRS for DFT-s-OFDM, pre-DFT, indicating a set of thresholds T={NRBn, n=0, 1, 2, 3, 4}, which indicates the dependency between the presence of PTRS and the scheduled bandwidth, as well as the values of X (number of PTRS groups) and K (number of samples per PTRS group) that the UE should use depending on the scheduled bandwidth. The parameter timeDensityTransformPrecoding defines the time density at DFT-s-OFDM symbol level of PTRS for DFT-s-OFDM. It defines DFT-S-OFDM symbols containing PTRS. For example, it may indicate that each DFT-S-OFDM symbol allocated with physical uplink shared channel (PUSCH) data contains PTRS, or alternatively every second DFT-S-OFDM symbol.

Table 2 below depicts the PTRS group pattern as a function of scheduled bandwidth. $N_{RB}$, $N_{RB0}$, $N_{RB1}$, $N_{RB2}$, $N_{RB3}$ and $N_{RB4}$ indicate bandwidth ranges.

TABLE 2

| Scheduled bandwidth | Number of PTRS groups | Number of samples per PTRS group |
|---|---|---|
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

Since DFT-s-OFDM is based on the use of several orthogonal subcarriers, the phase noise effects in the frequency domain may be divided into two components: common phase error (CPE) and inter-carrier interference (ICI).

CPE may produce a rotation that is common to the subcarriers, and it may be compensated by rotating the subcarriers with the estimated CPE value. ICI may be caused by the loss of orthogonality between subcarriers due to the convolution between the phase noise frequency response and the data-bearing subcarriers. In the time domain, CPE may be observed as a common phase rotation over the time domain samples, and ICI may be seen as the time variation of the phase noise within the DFT-s-OFDM symbol. Currently, 5G NR may use PTRS inserted in the time-domain, and thus both CPE and ICI may be estimated and compensated in the time-domain.

However, the legacy PTRS patterns described above may not be sufficient to track the phase noise to work for higher order modulations and high bandwidths, i.e. when a large number of physical resource blocks (PRBs) is scheduled. The phase noise impact may be larger when using a lower subcarrier spacing (SCS), such as 120 kHz, when compared to using a higher SCS, such as 960 kHz.

One significant issue is that the distance between consecutive PTRS blocks in the time domain may be too large, which means that the phase noise changes too much between the estimated blocks, resulting in performance degradation.

Another significant issue may be that, in most PTRS patterns, one of the PTRS groups is inserted into the beginning of the DFT-s-OFDM symbol, and one is inserted into the end of the DFT-s-OFDM symbol. Therefore, the end of the DFT-s-OFDM symbol may experience significant interference, for example due to energy leakage from the data sub-symbols, or from other impairments related to the beginning or end of DFT-S-OFDM symbols. These may be seen as corner or boundary effects.

Some exemplary embodiments may be used to provide new PTRS patterns to address the above issues. The new PTRS patterns may also be referred to as advanced patterns or aggregated patterns herein. In an aggregated pattern, multiple (unique) PTRS patterns may be combined into a single pattern, i.e. within a single DFT-s-OFDM symbol. For example, an aggregated pattern may comprise any combination of the five legacy PTRS patterns described above. The number of aggregated patterns can be increased or changed based on the channel condition or a decision of the scheduler. For example, if the UE is expected to use higher order modulation (64QAM) and/or relatively high bandwidth, it may be configured to use pattern(s) with a high number of PTRS resource elements.

In some exemplary embodiments, configuration identifiers (config IDs) may be defined for the legacy PTRS patterns in order to facilitate aggregation for multiple PTRS patterns. Table 3 below depicts an exemplary set of config IDs for the legacy PTRS patterns. PTRS symbols may be located in clusters of two or four consecutive resource elements, for example. This cluster of PTRS symbols may be referred to as a PTRS group (or PTRS block).

TABLE 3

| Config ID | Number of PTRS groups | Number of samples per PTRS group |
|---|---|---|
| 0 | 2 | 2 |
| 1 | 2 | 4 |
| 2 | 4 | 2 |
| 3 | 4 | 4 |
| 4 | 8 | 4 |

Some exemplary embodiments may also support unequal, balanced, and/or shifted PTRS patterns. These may be associated with a corresponding config ID (for example config IDs>4). In other words, one or more additional rows may be added to Table 3 for the unequal, balanced, and/or shifted PTRS patterns. These config IDs may be supported by radio resource control (RRC) signaling, for example. In order to provide support for the unequal, balanced, and/or shifted patterns, one or more additional rows may also be added to Table 1.

An unequal PTRS pattern refers to a pattern having different numbers of PTRS symbols in different groups.

A balanced PTRS pattern refers to a pattern, wherein some PTRS symbols of at least one group are moved from the at least one group to the last group within a DFT-s-OFDM symbol. This way, the last group, which may experience the most interference, will get more PTRS symbols for estimation. Balancing can also be done, for example, by moving to any other group(s) than the last group. For example, some PTRS symbols of at least one group may be moved to the first group, or to the next or previous DFT-s-OFDM symbol. Balancing may also refer to the case where PTRS groups having a different number of symbols per group are modified so that each group comprises as equal a number of symbols as possible, i.e., PTRS group sizes are 'balanced' or equalized.

A shifted PTRS pattern refers to a pattern, wherein the last and/or the first PTRS group is shifted from the end of the DFT-s-OFDM symbol. This can be done, for example, by modifying Table 1. The effect, i.e. the size of the shift, may depend on the subcarrier spacing and/or modulation and/or bandwidth, for example. For example, for 120 kHz SCS, four resource elements may be shifted from the end. For 480 kHz SCS, eight resource elements may be shifted from the end. For 960 kHz SCS, 12 resource elements may be shifted from the end. Shifting may also refer to shifting any other group than the last or first group, and shifting can be done using the same factor or different factor for different groups. Shifting may also refer to the case where the PTRS groups are modified so that the symbols in the group(s) are not consecutive but have a specific interval ('span') between the symbols. An additional option for shifting may be, for example, to shift at least one pattern in the aggregated pattern by some offset to provide even more PTRS groups, and thus increase the time-domain granularity. For example, the fifth legacy pattern may be combined with a shifted third legacy pattern to provide an additional PTRS group.

In some exemplary embodiments, unequal, shifted, and/or balanced PTRS patterns may be considered as new patterns (from PTRS mapping point of view), i.e. additional PTRS patterns in addition to the five legacy PTRS patterns. The new patterns may be aggregated with one another, and/or with the legacy patterns. The number of resource elements in the unequal, shifted, and/or balanced patterns may be the same as in the original pattern. This means that the shifting or balancing may have no impact to the coding rate of the associated PUSCH, when compared to the original pattern(s) without shifting or balancing.

Any combination of the five legacy PTRS patterns, unequal PTRS patterns, shifted PTRS patterns, and/or balanced PTRS patterns may be used in some exemplary embodiments. If different patterns include the same resource elements, then the overlapping resource elements may be accounted just once, i.e. the sequence length may be defined based on unique values in aggregated patterns. The aggregation may be defined as a union for resource elements among two or more PTRS patterns.

As an example, aggregating the five legacy patterns may comprise altogether 48 unique resource elements for PTRS, which may be the maximum PTRS patterns in some exemplary embodiments. In other words, combining the five legacy patterns may result in 14 PTRS groups, wherein some of the groups have two resource elements, and some of the groups have four resource elements, thus resulting in a total of 48 unique resource elements.

Figure 2:
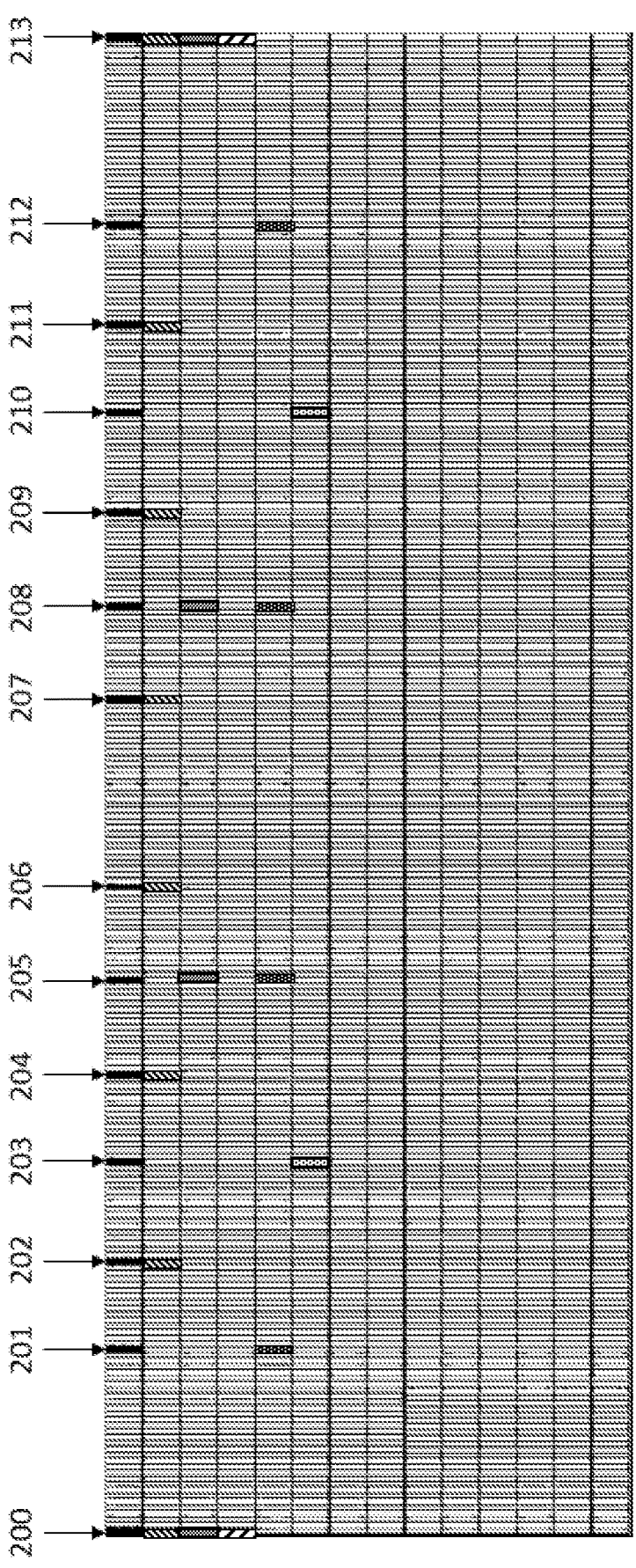
FIG. 2 illustrates a phase tracking reference signal pattern obtained by aggregation of five phase tracking reference signal patterns.

FIG. 2 illustrates an example allocation of the PTRS for one DFT-s-OFDM symbol. In other words, FIG. 2 illustrates a PTRS pattern obtained by aggregation of five PTRS patterns. In FIG. 2, the horizontal axis (i.e. the columns) indicates time, i.e. modulated symbols, and the vertical axis (i.e. the rows) indicates different PTRS patterns. The aggregated pattern is indicated on the top row by the arrows 200, 201, 202, 203, 204, 205, 206, 207, 208, 209, 210, 211, 212, 213.

It should be noted that aggregation among the five different legacy PTRS patterns may allow for $2^5=32$ PTRS patterns, including no PTRS. These options may be supported by the existing PTRS resource element definitions. However, there are a few combinations (for example a combination of the fifth and second legacy pattern, denoted as 5-2, and a combination of the fourth and second legacy pattern, denoted 4-2) which may result in the same pattern as the original pattern (i.e. 5 and 4), because the second legacy pattern comprises two PTRS groups of two PTRSs (one in the end and one in the beginning, which are overlapping with the first and last group of legacy patterns 5 and 4). However, a unique pattern may be provided even for the 5-2 and 4-2 combinations by applying shifting, for example. As an example, if the pattern is constructed as a combination of the fifth legacy pattern and a shifted second legacy pattern, then this may provide a unique pattern. Furthermore, depending on the signaling solution, it may be enough to support, for example, 8 or 16 pre-defined PTRS patterns out of the 32 PTRS patterns.

Table 4 below shows an example for the legacy patterns and the updated PTRS configurations comprising aggregated PTRS patterns. In this example, the legacy patterns may be considered as default configurations for the existing bandwidth ranges. It should be noted that some exemplary embodiments are not limited to using the existing bandwidth ranges, and they can also be applied on top of any bandwidth ranges. In some exemplary embodiments, the default configuration may also vary, for example according to subcarrier spacing. A default configuration may also be formed based on aggregation of multiple patterns. In other words, in some exemplary embodiments, the default configurations may be pre-defined, and thus some exemplary embodiments may be implemented without any additional RRC signaling. The updated configurations (for example "0, 4" in Table 4 indicating a combination of legacy patterns associated with config IDs 0 and 4) may be indicated for example via RRC signaling in some exemplary embodiments. This can be done separately per bandwidth range, as shown in Table 4 below. In this case, the updated configurations may replace the default configurations.

TABLE 4

| Scheduled bandwidth | Default configuration | Updated configuration (example) |
|---|---|---|
| $N_{RB0} \le N_{RB} < N_{RB1}$ | 0 | 0 |
| $N_{RB1} \le N_{RB} < N_{RB2}$ | 1 | 0, 4 |
| $N_{RB2} \le N_{RB} < N_{RB3}$ | 2 | 0, 4 |
| $N_{RB3} \le N_{RB} < N_{RB4}$ | 3 | 3, 4 |
| $N_{RB4} \le N_{RB}$ | 4 | 0, 1, 2, 3, 4 |

The updated configurations may also be tied to the subcarrier spacing and/or modulation and coding scheme (MCS).

Figure 3:
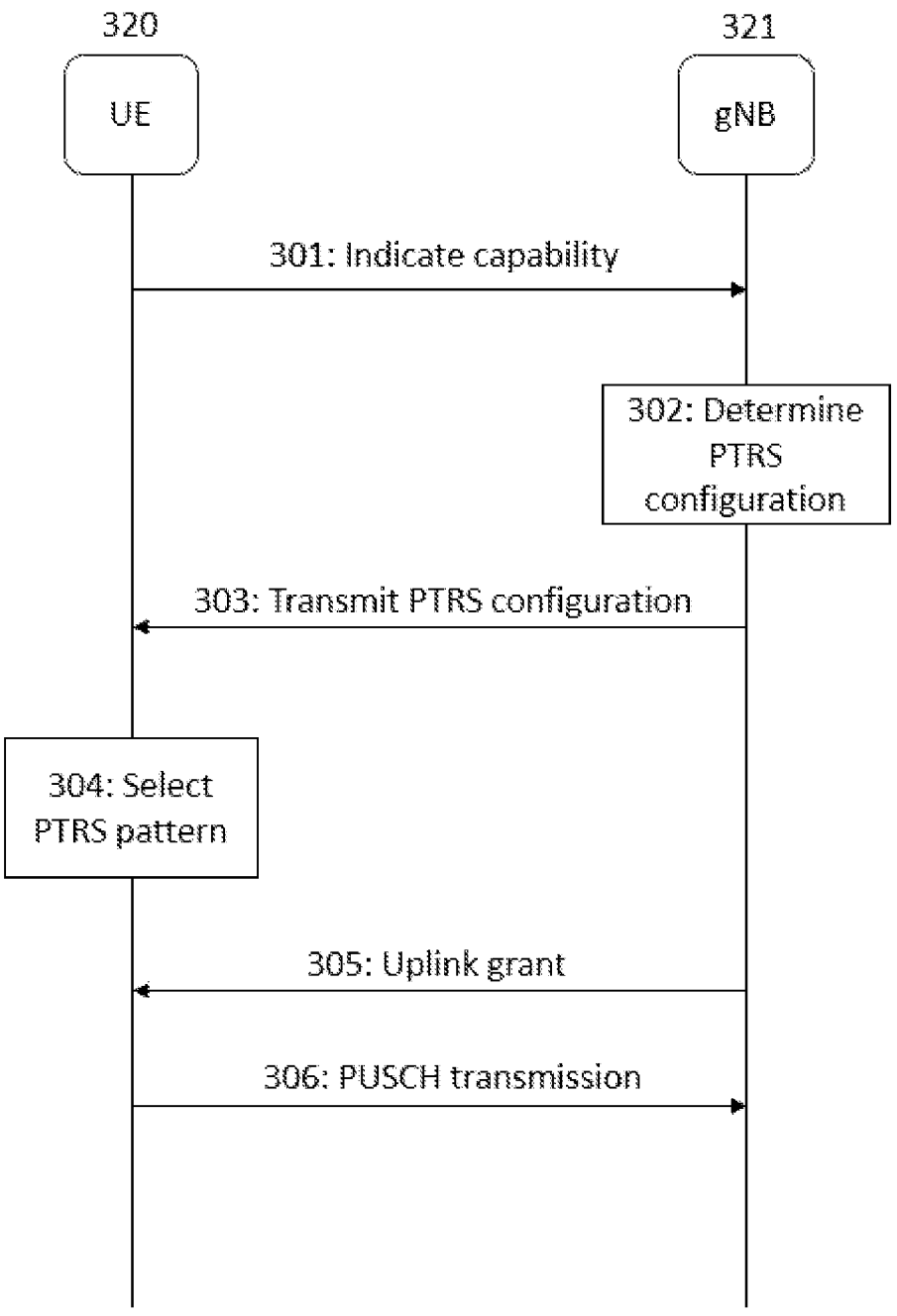
FIG. 3 illustrates a signaling diagram according to an exemplary embodiment.

FIG. 3 illustrates a signaling diagram according to an exemplary embodiment. A UE 320 indicates 301 a capability to apply an aggregated PTRS pattern to a base station 321, such as a gNB. Upon receiving the indication, the base station becomes aware of the UE's capability to apply an aggregated PTRS pattern, i.e. whether or not the UE is capable of applying an aggregated PTRS pattern. The base station may become aware of the UE capability based on implicit or explicit signaling, or based on other information. The other information may comprise, for example, operation based on a certain specification or specification release or a certain UE capability.

The base station determines 302 a PTRS configuration for the UE based on the received indication and/or other information, such as MCS, SCS, bandwidth, phase noise profile, and/or channel conditions. A PTRS pattern indicates resource elements with PTRS, whereas the PTRS configuration may comprise multiple PTRS patterns for different scenarios, for example for different bandwidth options. Thus, the determined PTRS configuration may comprise multiple PTRS patterns for example for different bandwidth options. If the UE indicates that it is capable of applying an aggregated PTRS pattern, then the determined PTRS configuration may comprise at least one aggregated PTRS pattern. On the other hand, if the UE indicates that it is not capable of operating according to an aggregated PTRS pattern, then the determined PTRS configuration may not comprise an aggregated PTRS pattern.

The base station transmits 303 the determined PTRS configuration to the UE. In other words, the base station indicates the determined PTRS configuration to the UE for example by using RRC signaling.

The UE selects 304, or determines, at least one PTRS pattern based on the received PTRS configuration, and configures the PTRS pattern of the UE according to the selected at least one PTRS pattern.

The base station transmits 305 an uplink grant to the UE, wherein the uplink grant triggers DFT-s-OFDM for a physical uplink shared channel (PUSCH) transmission for example by using a higher layer configuration such as RRC, or physical layer signaling such as downlink control information (DCI) format 0_0 or 0_1.

The UE transmits 306 the triggered PUSCH transmission to the base station based on the received uplink grant and the selected at least one PTRS pattern.

In some exemplary embodiments, the functions of blocks 301-303 of FIG. 3 may be optional. For example, if a PTRS configuration comprising one or more aggregated PTRS patterns is pre-defined, or hard-coded, to be supported by the UE, then there may be no need for transmitting the PTRS configuration via RRC signaling, and thus the functions of blocks 301-303 may not be needed. Alternatively, the UE may receive from the base station a configuration comprising, for example, a definition or indication of the related PRB ranges, based on which the UE may select an aggregated PTRS pattern from the pre-defined PTRS configuration.

In some exemplary embodiments, the PTRS configuration received by the UE from the base station may comprise a plurality of aggregated PTRS patterns, and one of the aggregated PTRS patterns may be selected by the UE based at least partly on at least one of the following: a PRB range, a modulation range, an MCS, an SCS range, and/or a bandwidth.

Figure 4:
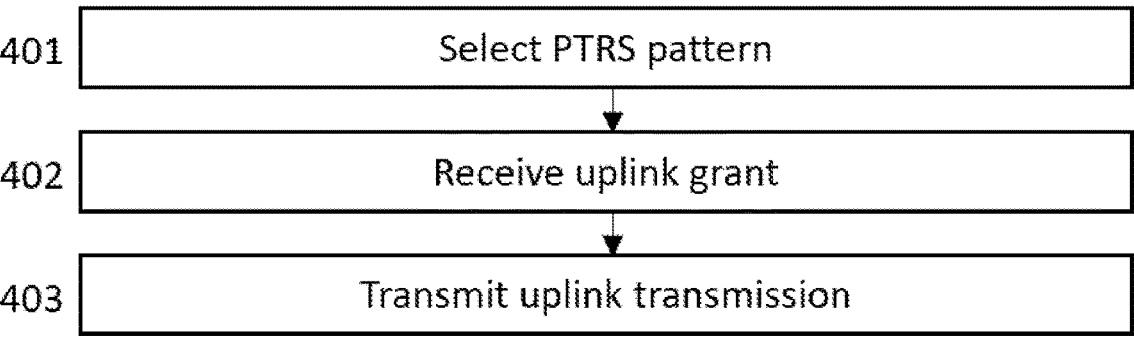
FIGS. 4-5 illustrate flow charts according to some exemplary embodiments.

FIG. 4 illustrates a flow chart according to an exemplary embodiment. The functions illustrated in FIG. 4 may be performed by an apparatus such as a UE, or an apparatus comprised in a UE. Referring to FIG. 4, an aggregated PTRS pattern comprising a combination of two or more PTRS patterns is selected 401, or determined. For example, the aggregated PTRS pattern may be selected based at least partly on an SCS, an MCS, and/or a bandwidth. The aggregated PTRS pattern may comprise one or more legacy PTRS patterns, one or more unequal PTRS patterns, one or more balanced PTRS patterns, and/or one or more shifted PTRS patterns. An uplink grant is received 402 from a base station. The uplink grant may be indicated, for example, via DCI, or RRC configured resource allocation for configured grant, or semi-persistent allocation. An uplink transmission is transmitted 403 to the base station based at least partly on the uplink grant and the aggregated PTRS pattern by using DFT-s-OFDM or other single-carrier or single-carrier like waveform, such as known-tail DFT-s-OFDM (KT-DFT-s-OFDM) or zero-tail DFT-s-OFDM (ZT-DFT-s-OFDM). The uplink transmission may be, for example, a PUSCH transmission or a physical uplink control channel (PUCCH) transmission.

In some exemplary embodiments, the aggregated PTRS pattern, and/or the two or more PTRS patterns comprised in the aggregated PTRS pattern, may be associated with a configuration identifier, and the aggregated PTRS pattern may be selected based at least partly on the configuration identifier.

In another exemplary embodiment, pre-defined aggregated PTRS patterns may be supported. These aggregated patterns may also be considered as separate configurations, i.e. having separate configuration identifiers. Thus, the aggregated PTRS pattern may be selected from a pre-defined set of aggregated PTRS patterns.

In another exemplary embodiment, the aggregated PTRS pattern may be received from a base station for example in an RRC configuration indicating the aggregated PTRS pattern. The RRC configuration may comprise a bitmap per bandwidth range. In other words, the RRC configuration may comprise a bitmap for at least one bandwidth range, wherein the aggregated PTRS pattern is selected based at least partly on the bitmap. The bitmap size may be, for example, 5×5 bits, where a given option of the five scheduled bandwidth options comprises five possible PTRS patterns and their aggregation options.

In another exemplary embodiment, the unequal, shifted, and/or balanced PTRS patterns may be used without aggregation. In other words, an individual unequal, shifted, or balanced PTRS pattern may also be used.

Figure 5:
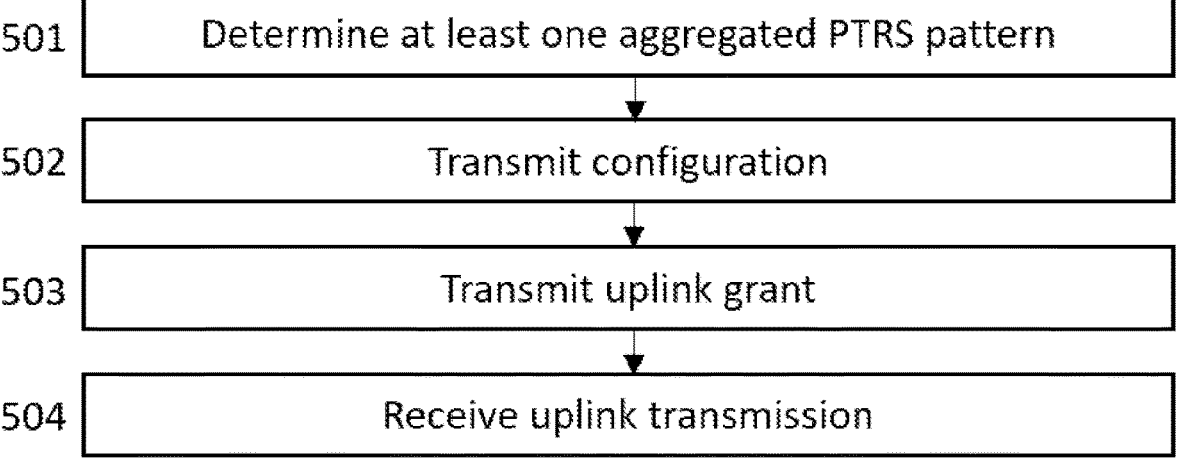

FIG. 5 illustrates a flow chart according to an exemplary embodiment. The functions illustrated in FIG. 5 may be performed by an apparatus such as a base station, or an apparatus comprised in a base station. Referring to FIG. 5, at least one aggregated PTRS pattern comprising a combination of two or more PTRS patterns is determined 501. A configuration indicating the at least one aggregated PTRS pattern is transmitted 502 to a terminal device. The configuration may be transmitted by using RRC signaling, for example. The configuration may comprise the at least one aggregated PTRS pattern, or a configuration identifier indicating the at least one aggregated PTRS pattern from a pre-defined set of PTRS patterns at the UE. An uplink grant is transmitted 503 to the UE, wherein the uplink grant indicates the UE to transmit an uplink transmission based at least partly on the at least one aggregated phase tracking reference signal pattern by using DFT-s-OFDM or other single carrier waveform. The uplink transmission based on the uplink grant is received 504 from the UE.

In another exemplary embodiment, a base station may transmit a downlink transmission to a UE based at least partly on an aggregated PTRS pattern by using DFT-s-OFDM or other single carrier waveform. The downlink transmission may be, for example, a physical downlink shared channel (PDSCH) transmission or a physical downlink control channel (PDCCH) transmission.

The functions and/or blocks described above by means of FIGS. 3-5 are in no absolute chronological order, and some of them may be performed simultaneously or in an order differing from the described one. Other functions and/or blocks may also be executed between them or within them.

A technical advantage provided by some exemplary embodiments is that they may enable improved phase noise compensation. In some exemplary embodiments, if using aggregation without any shifts, the PTRS symbol positions may remain substantially the same, while still providing a significant improvement on the PTRS density and performance. Furthermore, shifting the last and/or the first symbol may improve the performance of a given PTRS pattern, while also providing efficient phase noise compensation when multiple PTRS patterns are aggregated. In addition, some exemplary embodiments may provide a considerable performance gain for DFT-s-OFDM uplink transmission. Moreover, some exemplary embodiments may provide flexibility for the gNB to optimize the PTRS for different scenarios.

Figure 6:
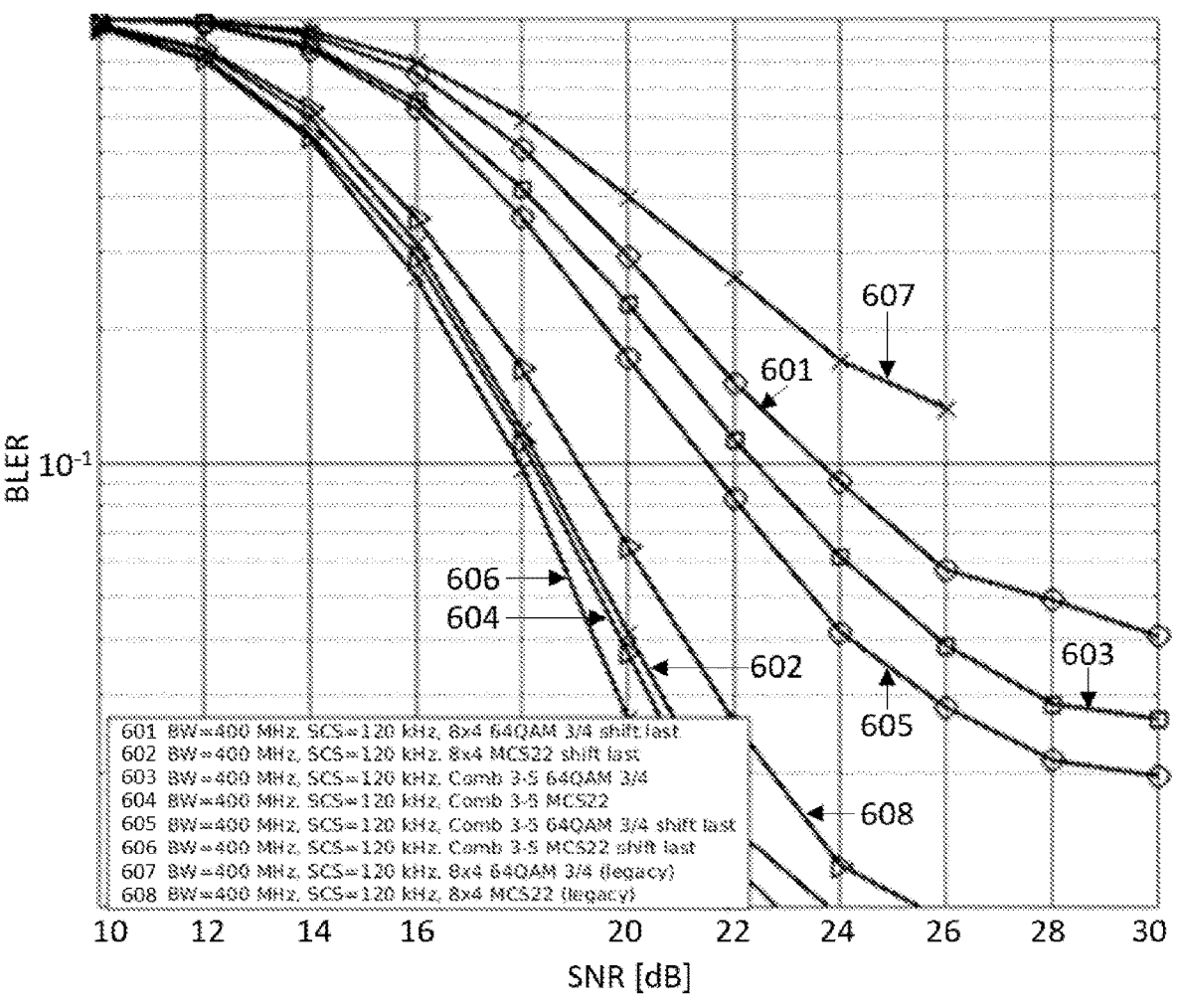
FIG. 6 illustrates simulated measurement results according to some exemplary embodiments.

FIG. 6 illustrates simulated measurement results for DFT-s-OFDM with a bandwidth (BW) of 400 MHz and with 120 kHz SCS. FIG. 6 illustrates the results obtained with advanced configurations 601, 602, 603, 604, 605, 606 according to some exemplary embodiments, and compares them with results obtained for legacy 8×4 configurations 607, 608. In FIG. 6, the horizontal axis indicates signal-to-noise ratio (SNR) in decibels (dB), and the vertical axis indicates block error rate (BLER). 64-QAM (quadrature amplitude modulation) is used in the advanced configurations 601, 603, 605 and in the first legacy configuration 607. Modulation and coding scheme 22 (MCS 22) is used in the advanced configurations 602, 604, 606 and in the second legacy configuration 608. It may be observed that the exemplary embodiments illustrated in FIG. 6 provide significant improvements over the legacy configurations. In other words, the advanced 64QAM configurations 601, 603, 605 provide improvements in SNR over the legacy 64QAM configuration 607, and the advanced MCS 22 configurations 602, 604, 606 provide improvements in SNR over the legacy MCS 22 configuration 608.

For example, in one exemplary embodiment 602 using an 8×4 configuration and MCS 22, the last group is shifted from the end without aggregation, which already provides approximately a 0.7 dB improvement over the legacy configuration 608 for MCS 22, and enables a higher code rate such as 3/4. In another exemplary embodiment 604 using MCS 22, legacy patterns 3 (4×2) and 5 (8×4) are aggregated, which provides altogether 12 groups of PTRS, four having two samples per group, and eight having four samples per group. This provides approximately a 0.9 dB improvement over the legacy configuration 608 for MCS 22. In this case, PTRS overhead may be increased by just 0.25%, approximately. In another exemplary embodiment 606, wherein the last PTRS group is shifted in the aggregated pattern for MCS 22, a further improvement of approximately 0.3 dB may be obtained.

Figure 7:
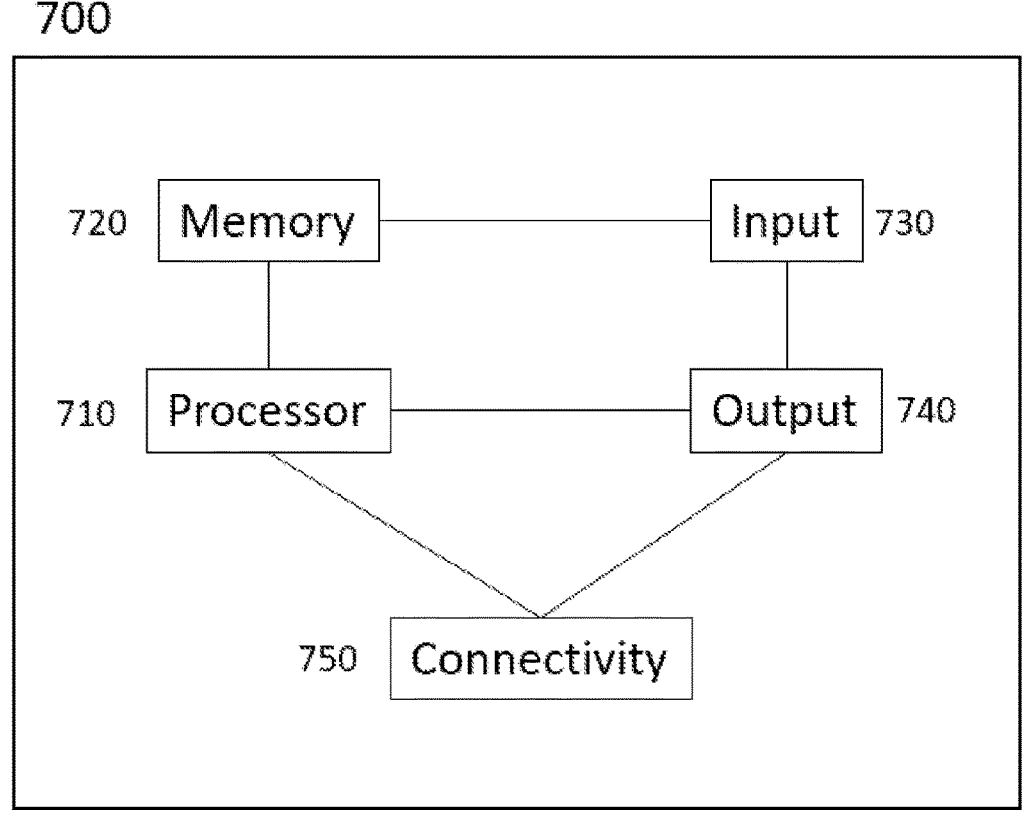
FIGS. 7-8 illustrate apparatuses according to some exemplary embodiments.

FIG. 7 illustrates an apparatus 700, which may be an apparatus such as, or comprised in, a terminal device, according to an exemplary embodiment. A terminal device may also be referred to as a UE or user equipment herein. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application-specific integrated circuits (ASICs).

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 720 stores computer readable instructions that are executed by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via an electromagnetic carrier signal and/or may be copied from a physical entity such as a computer program product. Execution of the computer readable instructions causes the apparatus 700 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 700 may further comprise, or be connected to, an input unit 730. The input unit 730 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 730 may comprise an interface to which external devices may connect to.

The apparatus 700 may also comprise an output unit 740. The output unit may comprise or be connected to one or more displays capable of rendering visual content, such as a light emitting diode (LED) display, a liquid crystal display (LCD) and/or a liquid crystal on silicon (LCoS) display. The output unit 740 may further comprise one or more audio outputs. The one or more audio outputs may be for example loudspeakers.

The apparatus 700 further comprises a connectivity unit 750. The connectivity unit 750 enables wireless connectivity to one or more external devices. The connectivity unit 750 comprises at least one transmitter and at least one receiver that may be integrated to the apparatus 700 or that the apparatus 700 may be connected to. The at least one transmitter comprises at least one transmission antenna, and the at least one receiver comprises at least one receiving antenna. The connectivity unit 750 may comprise an integrated circuit or a set of integrated circuits that provide the wireless communication capability for the apparatus 700. Alternatively, the wireless connectivity may be a hardwired application-specific integrated circuit (ASIC). The connectivity unit 750 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 700 may further comprise various components not illustrated in FIG. 7. The various components may be hardware components and/or software components.

Figure 8:
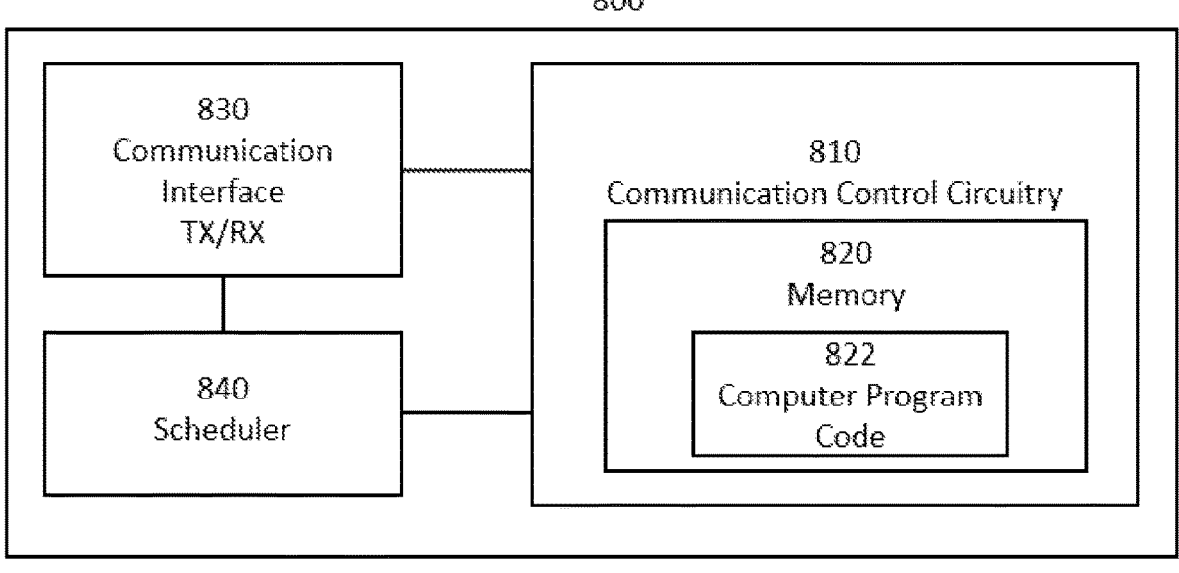

The apparatus 800 of FIG. 8 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out some of the exemplary embodiments described above.

The memory 820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 800 may further comprise a communication interface 830 comprising hardware and/or software for realizing communication connectivity according to one or more communication protocols. The communication interface 830 comprises at least one transmitter (TX) and at least one receiver (RX) that may be integrated to the apparatus 800 or that the apparatus 800 may be connected to. The communication interface 830 provides the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources.

As used in this application, the term "circuitry" may refer to one or more or all of the following:

a. hardware-only circuit implementations (such as implementations in only analog and/or digital circuitry) and b. combinations of hardware circuits and software, such as (as applicable):

i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor and at least one memory including computer program code, wherein the at least one memory and the computer program code are configured, with the at least one processor, to cause the apparatus to:

select an aggregated phase tracking reference signal pattern comprising a combination of two or more phase tracking reference signal patterns, wherein the aggregated phase tracking reference signal pattern is selected from a pre-defined set of aggregated phase tracking reference signal patterns, and wherein the two or more phase tracking reference signal patterns are combined into a single pattern within a single discrete Fourier transform spread orthogonal frequency division multiplexing, DFT-s-OFDM, symbol;

receive an uplink grant from a base station; and transmit, to the base station, an uplink transmission based at least partly on the uplink grant and the aggregated phase tracking reference signal pattern by using discrete Fourier transform spread orthogonal frequency division multiplexing, wherein the aggregated phase tracking reference signal pattern comprises:

a shifted phase tracking reference signal pattern, wherein a last and/or a first phase tracking reference signal group is shifted from the end of the DFT-s-OFDM symbol, a balanced phase tracking reference signal pattern, wherein some phase tracking reference signal symbols of at least one group are moved from the at least one group to the last group within the DFT-s-OFDM symbol, and an unequal phase tracking reference signal pattern, wherein the unequal phase tracking reference signal pattern has different numbers of phase tracking reference signal symbols in different groups.

2. The apparatus according to claim 1, wherein the apparatus is further caused to:

transmit, to the base station, an indication indicating a capability to use the aggregated phase tracking reference signal pattern; and receive, from the base station, a configuration indicating the aggregated phase tracking reference signal pattern.

3. The apparatus according to claim 2, wherein the configuration comprises a bitmap for at least one bandwidth range; and wherein the aggregated phase tracking reference signal pattern is selected based at least partly on the bitmap.

4. The apparatus according to claim 1, wherein a number of resource elements in the unequal, shifted, and balanced patterns are the same as in an original pattern.

5. The apparatus according to claim 1, wherein the aggregated phase tracking reference signal pattern and the two or more phase tracking reference signal patterns are associated with a configuration identifier; and wherein the aggregated phase tracking reference signal pattern is selected based at least partly on the configuration identifier.

6. The apparatus according to claim 1, wherein the aggregated phase tracking reference signal pattern is selected from a plurality of aggregated phase tracking reference signal patterns based at least partly on:

a subcarrier spacing, a modulation and coding scheme, a bandwidth, a modulation range, and a physical resource block range.

7. The apparatus according to claim 1, wherein the apparatus is comprised in a terminal device.

8. A method comprising:

selecting an aggregated phase tracking reference signal pattern comprising a combination of two or more phase tracking reference signal patterns, wherein the aggregated phase tracking reference signal pattern is selected from a pre-defined set of aggregated phase tracking reference signal patterns, and wherein the two or more phase tracking reference signal patterns are combined into a single pattern within a single discrete Fourier transform spread orthogonal frequency division multiplexing, DFT-s-OFDM, symbol;

receiving an uplink grant from a base station; and transmitting, to the base station, an uplink transmission based at least partly on the uplink grant and the aggregated phase tracking reference signal pattern by using discrete Fourier transform spread orthogonal frequency division multiplexing, wherein the aggregated phase tracking reference signal pattern comprises:

a shifted phase tracking reference signal pattern, wherein a last and/or a first phase tracking reference signal group is shifted from the end of the DFT-s-OFDM symbol, a balanced phase tracking reference signal pattern, wherein some phase tracking reference signal symbols of at least one group are moved from the at least one group to the last group within the DFT-s-OFDM symbol, and an unequal phase tracking reference signal pattern, wherein the unequal phase tracking reference signal pattern has different numbers of phase tracking reference signal symbols in different groups.

9. The method according to claim 8, comprising:

transmitting, to the base station, an indication indicating a capability to use the aggregated phase tracking reference signal pattern; and receiving, from the base station, a configuration indicating the aggregated phase tracking reference signal pattern.

10. The method according to claim 8, wherein the configuration comprises a bitmap for at least one bandwidth range; and wherein the aggregated phase tracking reference signal pattern is selected based at least partly on the bitmap.

11. A non-transitory computer readable medium comprising instructions for causing an apparatus to perform at least:

selecting an aggregated phase tracking reference signal pattern comprising a combination of two or more phase tracking reference signal patterns, wherein the aggregated phase tracking reference signal pattern is selected from a pre-defined set of aggregated phase tracking reference signal patterns, and wherein the two or more phase tracking reference signal patterns are combined into a single pattern within a single discrete Fourier transform spread orthogonal frequency division multiplexing, DFT-s-OFDM, symbol;

receiving an uplink grant from a base station; and transmitting, to the base station, an uplink transmission based at least partly on the uplink grant and the aggregated phase tracking reference signal pattern by using discrete Fourier transform spread orthogonal frequency division multiplexing, wherein the aggregated phase tracking reference signal pattern comprises:

a shifted phase tracking reference signal pattern, wherein a last and/or a first phase tracking reference signal group is shifted from the end of the DFT-s-OFDM symbol, a balanced phase tracking reference signal pattern, wherein some phase tracking reference signal symbols of at least one group are moved from the at least one group to the last group within the DFT-s-OFDM symbol, and an unequal phase tracking reference signal pattern, wherein the unequal phase tracking reference signal pattern has different numbers of phase tracking reference signal symbols in different groups.

12. The non-transitory computer readable medium according to claim 11, comprising:

transmitting, to the base station, an indication indicating a capability to use the aggregated phase tracking reference signal pattern; and receiving, from the base station, a configuration indicating the aggregated phase tracking reference signal pattern.

13. The non-transitory computer readable medium according to claim 11, wherein the configuration comprises a bitmap for at least one bandwidth range; and wherein the aggregated phase tracking reference signal pattern is selected based at least partly on the bitmap.

* * * * *